(No Model.) 3 Sheets—Sheet 1.

G. BLAKISTONE.
SAFETY FENDER OR TRAP.

No. 513,703. Patented Jan. 30, 1894.

WITNESSES: INVENTOR:
A. O. Babendreier Georg Blakistone
H. MacCarthy Price Stewart
By
ATTORNEYS.

(No Model.) 3 Sheets—Sheet 2.

G. BLAKISTONE.
SAFETY FENDER OR TRAP.

No. 513,703. Patented Jan. 30, 1894.

WITNESSES:
A. O. Babendreier
H. MacCarthy

INVENTOR:
George Blakistone
By Price Stewart
ATTORNEYS.

THE NATIONAL LITHOGRAPHING COMPANY,
WASHINGTON, D. C.

(No Model.) 3 Sheets—Sheet 3.

G. BLAKISTONE.
SAFETY FENDER OR TRAP.

No. 513,703. Patented Jan. 30, 1894.

WITNESSES:
A. O. Babendreier
H. MacCarthy

INVENTOR:
George Blakistone
By Price Stewart
ATTORNEYS.

THE NATIONAL LITHOGRAPHING COMPANY,
WASHINGTON, D. C.

UNITED STATES PATENT OFFICE.

GEORG BLAKISTONE, OF BALTIMORE, MARYLAND.

SAFETY FENDER OR TRAP.

SPECIFICATION forming part of Letters Patent No. 513,703, dated January 30, 1894.

Application filed October 20, 1893. Serial No. 488,739. (No model.)

*To all whom it may concern:*

Be it known that I, GEORG BLAKISTONE, of the city of Baltimore and State of Maryland, have invented certain new and useful Improvements in Safety Fenders or Traps, of which the following is a full description.

My invention relates to improvements in safety traps or fenders for cars and has for its object to prevent injury to persons falling upon railway tracks in front of moving cars; it also serves as an aid in stopping the cars and to prevent obstructions from getting into contact with the driving mechanism on the car-truck and possibly injuring the same.

The invention is fully set forth in the specification and pointed out in the subjoined claims.

Figure 1:
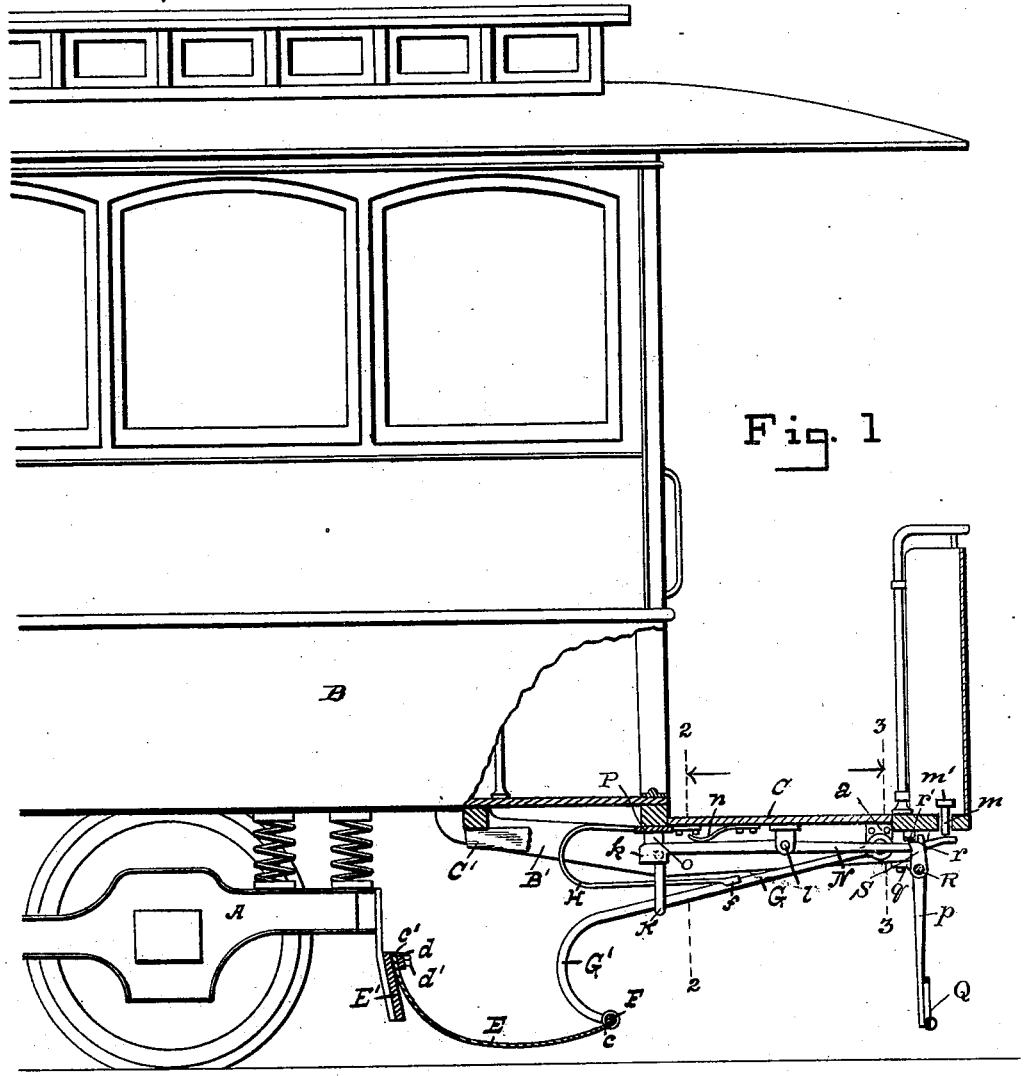
Figure 4:
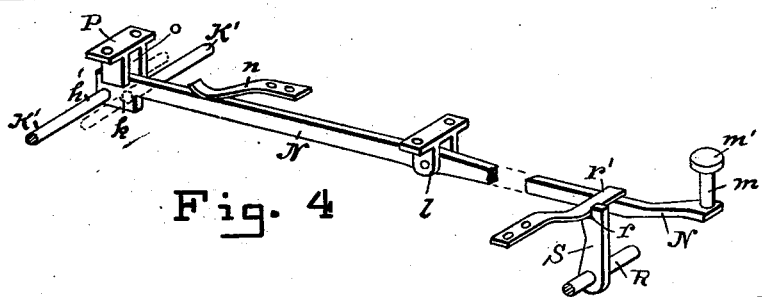
Figure 2:
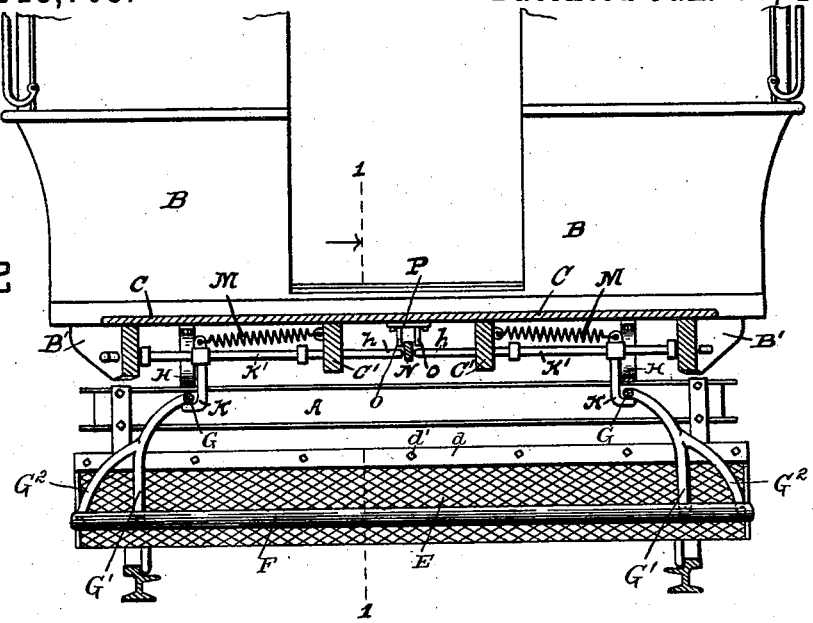
Figure 3:
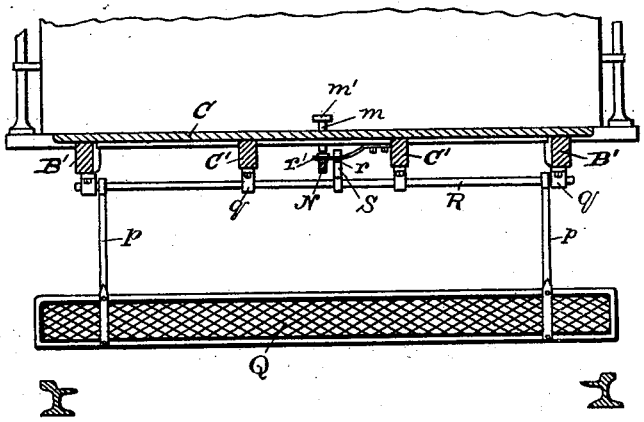
Figure 5:
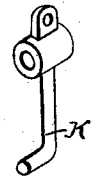
Figure 6:
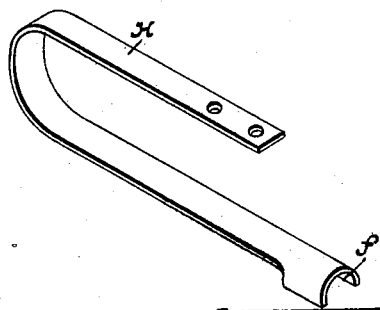
Figure 7:
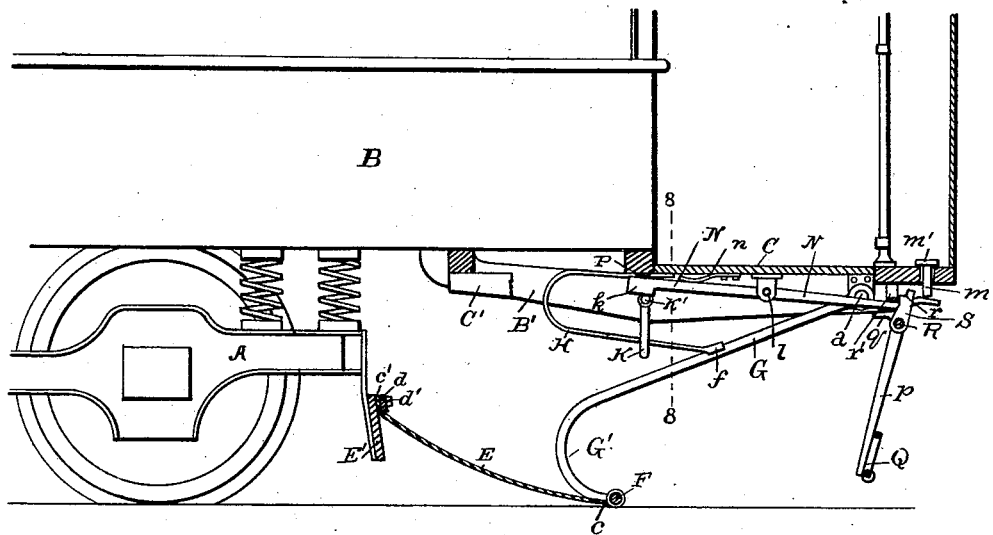
Figure 8:
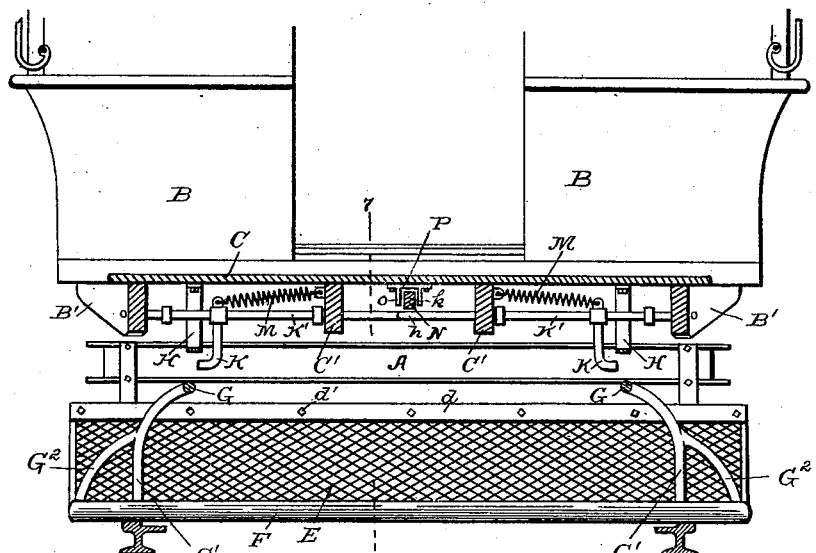

In the accompanying drawings illustrating the invention Figure 1 shows a side view of the front end of a car, taken on line 1—1 of Fig. 2, with the platform in section and the fender attached thereto, shown in its elevated position. Fig. 2 shows a vertical cross section of the apparatus taken on the line 2—2 of Fig. 1, looking to the left in the direction of the arrow; Fig. 3, a similar cross section taken on the line 3—3 of Fig. 1 and looking to the right in the direction of the arrow. Fig. 4 shows a perspective view of the foot lever and the respective parts connected therewith. Fig. 5 shows a perspective view of one of the fender-supporting hooks; Fig. 6, a perspective view of the fender-depressing spring; Fig. 7, a side view of the device with the trap down; Fig. 8, a front view of the same.

In other applications pending in the Patent Office I have shown and described a safety trap located beneath and back of the front end of a car platform with drag rods extending backwardly from the front and attached at their free ends to the safety trap so as to draw or pull the trap as distinguished from pushing. These features are also shown in the present application and in addition thereto I have made other improvements, chiefly in constructing the drag bars so as to conform to the body of a man and allow him to roll upon the trap without being thrust off by the bar, and also an automatic device by which an obstruction in front of the car will release the trap and allow it to drop upon the track in case the driver should fail to drop it promptly.

In the drawings, the letter A designates the car-truck; B the car-body; C the platform, and B', C', longitudinal bars each having one end secured to the under side of the car-body B, and the other end extending beyond the end of the same and supporting the said platform C; one of the bars B' is at each side of the car and the remaining bars C' are located between them and extend in the same direction, this construction being the usual method of supporting the platform C. Near the forward end and at the inner side of each of the two outside bars B', is fixed a journal $a$, on which is mounted one end of a rearwardly extending bar G. This bar near its rear end has a semicircular bend or hook G' opening toward the front end of the platform and of suitable form to receive that part of a body which is not in position to pass wholly into the trap. A bar F extending cross-wise connects the extremities of the two bars G and is supported thereby. The bars G may be connected to the cross-bar F by branches as shown at $G^2$. The cross-bar F constitutes the front spreader or pick-up bar of the safety trap and may be covered with some elastic material, such as rubber, if desired, and to it is attached the front edge $c$ of the fender apron or trap E, made of any suitable material, like rope netting, soft wire, or canvas. The rear edge $c'$ is elevated and in the present instance is secured to the top of the ordinary fender board E' by a facing bar $d$, and bolts or screws $d'$, or it may be attached to any suitable part of the car or truck. It will be seen from this construction that the trap is drawn or pulled as distinguished from being pushed forward.

Two flat U-shaped springs H (see Fig. 6), each have one end bolted to the under side of the car-body and the other end provided with a groove $f$ to take over the respective side bars G. The effect of these springs is to exert a downward pressure upon the said side bars G and thereby to force the cross-bar F down tightly upon the track.

The safety trap is normally supported or held some distance above the ground by two L-shaped hooks K (see Figs. 2 and 5) which take under the respective side bars G. Each of the two hooks K is rigidly mounted on a separate laterally movable cross-shaft K'. (See Fig. 2.)

The two cross-shafts K' are journaled in suitable supports as shown at B', C', and are slightly out of alignment, so that their inner ends $h$ may readily pass or overlap each other. Two spiral springs M, each have one end suitably attached to one of the respective cross-shafts K', and the other to one of the central platform supporting bars C', and exert their tension normally to draw the bars K' together toward the center of the car and release the hooks K from the bars G and at the same time cause the shaft ends $h$ to overlap or pass each other. The cross-shafts K' and hooks K are normally kept in position against the action of the spiral springs M by the rear end $k$ of lever N, suitably pivoted as shown at $l$. A depressing pin $m$ passes up and through the platform C and has a head $m'$ within easy reach of the grip or motorman's foot. By depressing the button $m'$ the rear end of the lever N is raised; this action sets free the cross-shafts K', allows the hooks K to be drawn from under the bars G, and the bar F to be forced down tightly upon the road or track bed. A spring $n$ secured at one end to the platform C has its free end resting upon the rear end of the foot lever N so as to normally keep it depressed and located between the inner ends of the two cross-shafts K', thus keeping the latter spread. This spring tends to take up the vibration of the car and prevent the lever from accidentally becoming disengaged from the cross-shafts.

A guide-block P is fastened to the platform near the rear end of the foot lever N, and has two depending arms $o$, which straddle the same and keep it in proper line but yet allow it to be raised and lowered.

I have also provided an automatic trip, which I will now explain.

A light swinging frame or gate Q, extends crosswise of the track (see Fig. 3), supported by rods $p$, depending from a cross-shaft R, journaled in bearings $q$, fastened to the supporting bars B', C', at the front end of the platform. This cross-shaft R has an upwardly extending arm S provided with a shoulder $r$. A flat spring $r'$ also fastened to the platform has its free end resting under tension on the shoulder $r$, and then passing across and above the foot lever N; this being its normal position. As soon as the light frame-work strikes an obstruction it will swing backward and throw out the arm, thereby releasing the spring $r'$, which then depresses the lever N, which in turn releases the fender or trap and allows it to drop.

The bar F is drawn over the surface of the road bed under considerable pressure or tension, but will readily pass over rigid obstructions without affecting its usefulness, and serves as an aid in stopping the car by being a practical track brake.

After the trap has been dropped it is reset by raising the spring $r'$ on to the shoulder $r$, and then raising the bar F and pulling the hooks K under the side bars G, which allows the rear end of the lever N to drop between the cross-shafts K', into position ready for another action.

What I claim, and desire to obtain by Letters Patent, is—

1. A safety trap for a car constructed of flexible material attached at its rear edge to a suitable part of the car and at its front edge to the rear end of the drawing rods, whose outer ends project forward and are suitably fastened to the front of the car, means for holding the trap suspended and an automatic tripping device to release the trap, actuated by an obstruction on the track.

2. A safety trap for a car located below and backward of the front of the car, in combination with drawing rods for the trap, attached at their forward ends to a suitable part of the car and their rear ends to the front edge of the trap, and curved or bent at their rear ends to conform to the figure of an object on the track and thereby receive any part thereof not in position to pass wholly within the trap.

3. In a safety trap for cars, the combination of a car body, two drawing bars extending rearwardly and fastened at their front ends to a suitable part of the car and joined by a cross-bar at their rear ends, a flexible apron or receptacle attached to the cross-bar and extending back from the same, supports for normally holding the cross-bar elevated, and means to automatically trip said supports actuated by an obstruction on the track and thereby release the bars and allow the trap to drop.

4. In a safety trap for cars, the combination of a car body, two bars pivoted at their front ends to the car body and extending backward and then terminating in a hook pointing downward with the open side toward the front ends, a cross bar connecting the hook ends of said bars and forming the front bar of the trap, a flexible apron or receptacle having one end attached to the cross bar and the other connected with a suitable part of the car, two hooks each mounted on a separate cross-shaft to normally support the trap above the ground, a lever to co-act with said cross-shafts and hooks, one or more springs to draw said cross-shafts and hooks against the action of said lever, a foot piece or pin to co-act with said lever to release the cross-shafts and hooks, and a depending frame connected with the lever to also release the cross-shafts for the purpose set forth.

5. In a safety trap for cars, the combination of a car body, two bars pivoted at their front ends to the car body and extending backward and then terminating in a hook pointing downward with the open side toward the front ends, a cross bar connecting the hook ends of said bars and forming the front bar of the trap, a flexible apron or receptacle having one end attached to the cross bar, and the other end attached to the ordinary fender board of the car, a fender board supported by depending arms from the truck, two hooks each mounted on a separate cross-shaft to normally support the trap above the ground, a lever to co-act with said cross-shafts and hooks, one or more springs to draw the cross-shafts and hooks together, a depressing foot pin to co-act with the said lever, a spring to normally depress one end of said lever, a depending frame supported from a cross shaft, an upwardly extending arm also attached with said latter cross-shaft, and a spring co-acting with both the said arm and foot lever for the purpose set forth.

Signed at Baltimore city and State of Maryland this 18th day of October, A. D. 1893.

GEORG BLAKISTONE.

Witnesses:
 JOHN L. HEBB,
 PARKS FISHER.